US011854246B2

(12) United States Patent
Li et al.

(10) Patent No.: US 11,854,246 B2
(45) Date of Patent: Dec. 26, 2023

(54) METHOD, APPARATUS, DEVICE AND STORAGE MEDIUM FOR RECOGNIZING BILL IMAGE

(71) Applicant: BEIJING BAIDU NETCOM SCIENCE AND TECHNOLOGY CO., LTD., Beijing (CN)

(72) Inventors: Yulin Li, Beijing (CN); Ju Huang, Beijing (CN); Xiameng Qin, Beijing (CN); Junyu Han, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 389 days.

(21) Appl. No.: 17/201,733

(22) Filed: Mar. 15, 2021

(65) Prior Publication Data
US 2021/0383107 A1  Dec. 9, 2021

(30) Foreign Application Priority Data

Jun. 9, 2020 (CN) .......................... 202010517447.1

(51) Int. Cl.
*G06N 3/08* (2023.01)
*G06V 30/413* (2022.01)
(Continued)

(52) U.S. Cl.
CPC ............. *G06V 10/82* (2022.01); *G06N 3/047* (2023.01); *G06N 3/08* (2013.01);
(Continued)

(58) Field of Classification Search
None
See application file for complete search history.

(56) References Cited

U.S. PATENT DOCUMENTS 10,572,725 B1  2/2020 Becker et al.
2015/0093021 A1  4/2015 Xu et al.
(Continued)

FOREIGN PATENT DOCUMENTS

CN  109086756 A  12/2018
CN  109635627 A  4/2019
(Continued)

OTHER PUBLICATIONS

H. Sidhwa, S. Kulshrestha, S. Malhotra and S. Virmani, "Text Extraction from Bills and Invoices," 2018 International Conference on Advances in Computing, Communication Control and Networking (ICACCCN), Greater Noida, India, 2018, pp. 564-568, doi: 10.1109/ICACCCN.2018.8748309. (Year: 2018).*

(Continued)

*Primary Examiner* — Idowu O Osifade
(74) *Attorney, Agent, or Firm* — Cozen O'Connor

(57) ABSTRACT

A method, apparatus, device and storage medium for recognizing a bill image may include: performing text detection on a bill image, and determining an attribute information set and a relationship information set of each text box of at least two text boxes in the bill image; determining a type of the text box and an associated text box that has a structural relationship with the text box based on the attribute information set and the relationship information set of the text box; and extracting structured bill data of the bill image, based on the type of the text box and the associated text box that has the structural relationship with the text box.

12 Claims, 10 Drawing Sheets

(51) Int. Cl.
*G06V 30/414* (2022.01)
*G06N 3/047* (2023.01)
*G06V 10/82* (2022.01)
*G06V 30/18* (2022.01)
*G06V 30/19* (2022.01)
*G06V 30/412* (2022.01)
*G06V 30/16* (2022.01)
*G06V 30/10* (2022.01)

(52) U.S. Cl.
CPC .. *G06V 30/18057* (2022.01); *G06V 30/19173* (2022.01); *G06V 30/412* (2022.01); *G06V 30/413* (2022.01); *G06V 30/414* (2022.01); *G06V 30/10* (2022.01); *G06V 30/1607* (2022.01)

(56) References Cited

U.S. PATENT DOCUMENTS

| | | | |
|---|---|---|---|
| 2016/0189119 A1* | 6/2016 | Bowman | G06Q 20/3821 705/39 |
| 2020/0104587 A1 | 4/2020 | Bhatnagar et al. | |
| 2020/0160086 A1 | 5/2020 | Florencio et al. | |
| 2020/0175267 A1 | 6/2020 | Schäfer et al. | |

FOREIGN PATENT DOCUMENTS

| | | |
|---|---|---|
| CN | 109816118 | 5/2019 |
| CN | 109858420 A | 6/2019 |
| CN | 109948507 A | 6/2019 |
| CN | 110751038 A | 2/2020 |
| CN | 110991456 A | 4/2020 |
| EP | 3 660 733 A1 | 6/2020 |
| JP | 2006126943 A | 5/2006 |
| JP | 2018005462 A | 1/2018 |
| WO | WO 2020071558 A1 | 4/2020 |

OTHER PUBLICATIONS

Xavier Holt and Andrew Chisholm. 2018. Extracting structured data from invoices. In Proceedings of the Australasian Language Technology Association Workshop 2018, pp. 53-59, Dunedin, New Zealand. (Year: 2018).*

European patent application No. 21162692.4, Extended European Search Report dated May 14, 2021, 11 pages.

Japanese Patent Application No. 2021-032799 Notice of Reasons for Refusal dated Apr. 12, 2022, 3 pages.

English Translation of Japanese Patent Application No. 2021-032799 Notice of Reasons for Refusal dated Apr. 12, 2022, 3 pages.

* cited by examiner

```
                                                      ┌─ S101
       ┌────────────────────────────────────────────┐
       │ Performing text detection on a bill image, │
       │   and determining an attribute information │
       │  set and a relationship information set of │
       │  each text box of at least two text boxes  │
       │             in the bill image              │
       └────────────────────────────────────────────┘
                            │
                            ▼                         ┌─ S102
       ┌────────────────────────────────────────────┐
       │ Determining a type of the text box and an  │
       │ associated text box that has a structural  │
       │ relationship with the text box based on    │
       │ the attribute information set and the      │
       │ relationship information set of the text box│
       └────────────────────────────────────────────┘
                            │
                            ▼                         ┌─ S103
       ┌────────────────────────────────────────────┐
       │ Extracting structured bill data of the bill│
       │  image, based on the type of the text box  │
       │   and the associated text box that has the │
       │      structural relationship with the text │
       │                     box                    │
       └────────────────────────────────────────────┘
```

Fig. 1A

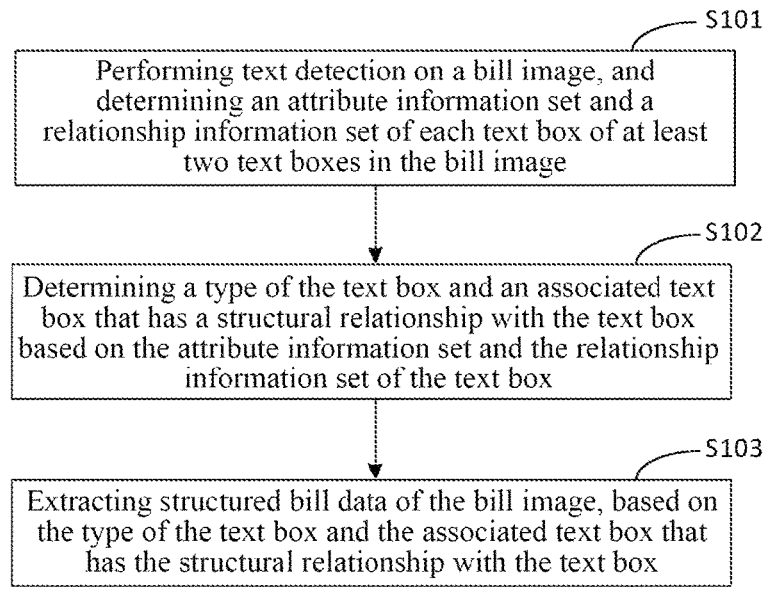

Fig. 1B

| Medical hospitalization charge bill | | | | | | |
|---|---|---|---|---|---|---|
| Business serial number | 2540000 | Medical record number | 001345678 | Admission number | | 27678 |
| Admission time | January 1, 2020 | Number of days in hospital | 3 | NO | | 1711111111 |
| Name | Zhang San | Gender | Male | Social Security Card Number | | |
| Charged items | Sum | | Charged items | | Sum | |
| Western medicine fee | 200.00 | | Nursing fee | | 70.00 | |
| Treatment fee | 1000.00 | | Surgery Fees | | 2000.00 | |
| Accounting (uppercase) | Three thousand two hundred seven yuan | | | ¥ 3270.00 | | |
| Prepayment amount | 5000.00 | Supplement payment | | Refund amount | | 1730.00 |
| Receiving unit (seal) | | Payee | 92974 | | | January 3, 2020 |

Fig. 1C

METHOD, APPARATUS, DEVICE AND STORAGE MEDIUM FOR RECOGNIZING BILL IMAGE

CROSS-REFERENCE TO RELATED APPLICATIONS

This application claims priority to Chinese Application No. 202010517447.1, filed on Jun. 9, 2020 and entitled "Method, Apparatus, Device and Storage Medium for Recognizing Bill Image," the content of which is hereby incorporated by reference in its entirety.

TECHNICAL FIELD

Embodiments of the present disclosure relate to the field of computer technology, and specifically to the fields of artificial intelligence deep learning and image processing.

BACKGROUND

The bill is an important text carrier of structured information and is widely used in various business scenarios. When reviewing the bill, relevant departments generally need to manually review information recorded in the bill, which is costly and inefficient. With the development of artificial intelligence technology, a technology of automatically recognizing a bill image and extracting bill information gradually emerges. At present, the existing technology generally extracts bill information at a fixed position on a bill based on template matching. However, due to the inconsistent layout and different structures of bills, it is difficult to maintain one template for each format of bill, which is poor in scalability and versatility, thereby affecting the accuracy of bill information extraction.

SUMMARY

A method, apparatus, device and storage medium for recognizing a bill image are provided.

In a first aspect, an embodiment of the present disclosure provides a method for recognizing a bill image, the method including: performing text detection on a bill image, and determining an attribute information set and a relationship information set of each text box of at least two text boxes in the bill image; determining a type of the text box and an associated text box that has a structural relationship with the text box based on the attribute information set and the relationship information set of the text box; and extracting structured bill data of the bill image, based on the type of the text box and the associated text box that has the structural relationship with the text box.

In a second aspect, an embodiment of the present disclosure provides an apparatus for recognizing a bill image, the apparatus including: a text detection module, configured to perform text detection on a bill image, and determine an attribute information set and a relationship information set of each text box of at least two text boxes in the bill image; an information inference module, configured to determine a type of the text box and an associated text box that has a structural relationship with the text box based on the attribute information set and the relationship information set of the text box; and a bill data extraction module, configured to extract structured bill data of the bill image, based on the type of the text box and the associated text box that has the structural relationship with the text box.

In a third aspect, an embodiment of the present disclosure provides an electronic device, the device electronic including: at least one processor; and a memory communicatively connected with the at least one processor, the memory storing instructions executable by the at least one processor, and the instructions, when executed by the at least one processor, causing the at least one processor to perform the method for recognizing a bill image according to any embodiment of the present disclosure.

In a fourth aspect, an embodiment of the present disclosure provides a non-transitory computer readable storage medium storing computer instructions, the computer instructions being used to cause a computer to perform the method for recognizing a bill image according to any embodiment of the present disclosure.

It should be understood that the content described in this section is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to embodiments of the present disclosure.

FIG. 1A is a flowchart of a method for recognizing a bill image according to an embodiment of the present disclosure;

FIGS. 1B-1C are schematic diagrams of visual effects of bill recognition according to an embodiment of the present disclosure;

DETAILED DESCRIPTION OF EMBODIMENTS

Figure 2:
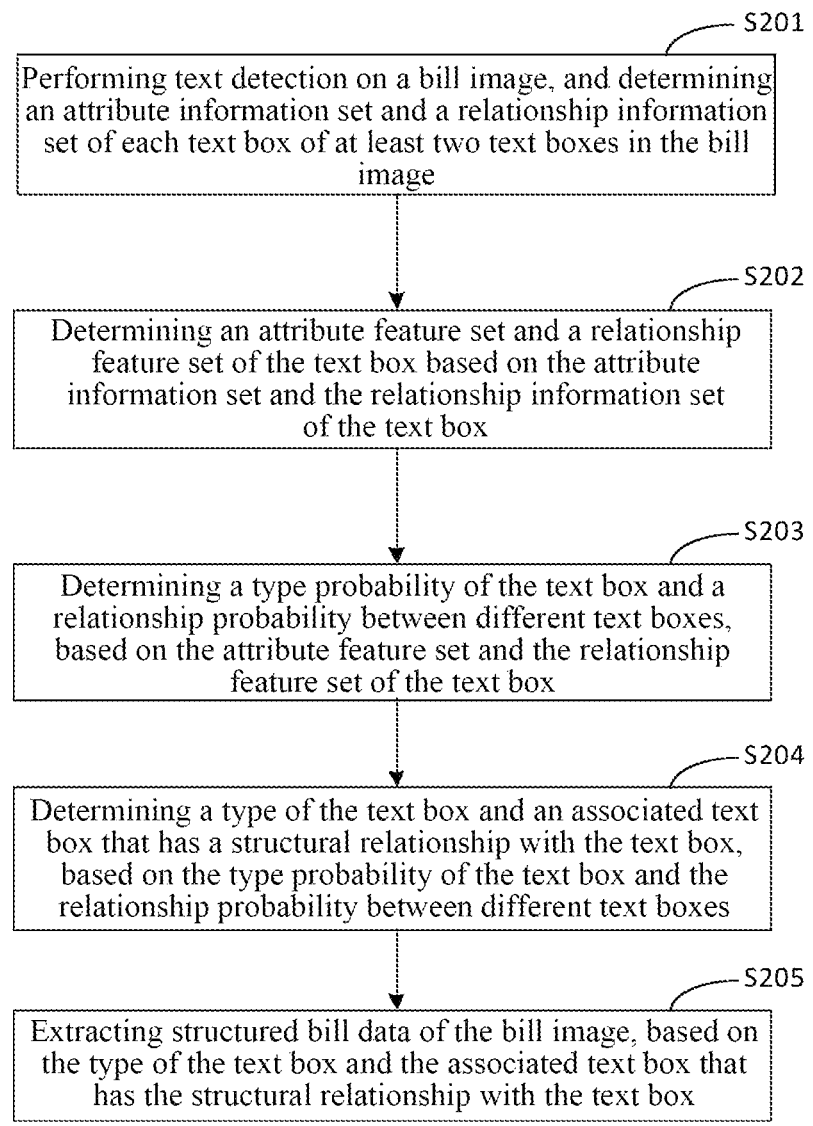
FIG. 2 is a flowchart of another method for recognizing a bill image according to an embodiment of the present disclosure.

The following describes example embodiments of the present disclosure with reference to the accompanying drawings, which include various details of embodiments of the present disclosure to facilitate understanding, and should be regarded as merely examples. Therefore, those of ordinary skill in the art should realize that various changes and modifications may be made to embodiments described herein without departing from the scope and spirit of the present disclosure. Likewise, for clarity and conciseness, descriptions of well-known functions and structures are omitted in the following description.

The technology according to embodiments of the present disclosure solves the problem that bill image recognition in the existing technology based on a fixed template has poor scalability and versatility and low recognition accuracy.

FIG. 1A is a flowchart of a method for recognizing a bill image according to an embodiment of the present disclosure. FIGS. 1B-1C are schematic diagrams of visual effects of bill recognition according to an embodiment of the present disclosure. The present embodiment is applicable to recognizing a bill image, in particular applicable to recognizing a variety of bill images of unfixed formats. The embodiment may be implemented by an apparatus for recognizing a bill image configured in an electronic device, and the apparatus may be implemented by software and/or hardware. As shown in FIGS. 1A-1C, the method includes following steps.

S101, performing text detection on a bill image, and determining an attribute information set and a relationship information set of each text box of at least two text boxes in the bill image.

A bill in an embodiment of the present disclosure may be a voucher indicating a payment amount in a certain format, which may be an invoice, a deposit certificate, a bill of exchange, a check, or the like. A text box may be a box in which a text string is labeled in a bill image after performing text detection on the bill image. For example, FIG. 1B shows a schematic diagram of a visual effect of labeled text boxes after performing text detection on a bill image, where each box in the bill image is used to box-select a text string. It should be noted that embodiments of the present disclosure are focused on how to infer structural relationships between a plurality of text boxes and further extract structured bill data when there is the plurality of text boxes in the bill image.

Alternatively, the attribute information set of each text box may be related information used to represent an attribute of the text string in the text box in the bill image, which may include but is not limited to: position coordinates, an image area, and a text content of the text box. The position coordinates of the text box may be position coordinates of four corner points of the text box. The image area may be an area corresponding to the text box in the bill image. The text content may be a content of the text string box-selected by the text box. The relationship information set of the text box may be information used to represent a relationship between different text boxes in the bill image, which may include but is not limited to: a position coordinate difference, a center point angle difference and a center point Euclidean distance between the text box and another text box.

Alternatively, embodiments of the present disclosure may use text detection technology, such as optical character recognition (OCR) technology detection, to first determine the attribute information set of each text box in the bill image, and then based on the attribute information set of each text box, determine the relationship information set between each text box and the other text box.

When the text detection technology is used to determine the attribute information set of each text box in the bill image, it may be implemented according to a preset algorithm. For example, a position of each text string in the bill image may be labeled first using a text area detection algorithm to obtain at least two text boxes, and then coordinates of four corner points of each text box are used as the position coordinates of the text box. An image corresponding to a text box area is intercepted from the bill image as the image area of the text box, and the text content in the text box is recognized using a text content detection algorithm. It may also be implemented based on a pre-trained neural network model. For example, the bill image may be inputted into a pre-trained target text detection model (such as EAST model). Based on a deep learning algorithm, the target text detection model labels the positions of the text strings in the bill image using text boxes, outputs the coordinates of the four corner points of the text boxes, and sorts in a clockwise direction to acquire a set of all the text boxes $P=\{p_i; i \in N^*\}$. Here, the $i^{th}$ text box $p_i=\{x_n, y_n; n \in (1,4)\}$. Then, based on the position coordinates of each text box, an image slice in the area of the text box is cut from the bill image as an image area $I_i$. Finally, each image area is inputted into a pre-trained text content recognition model (such as convolutional neural network CRNN model). The text content recognition model may predict text content $c_i$ in the image area based on the deep learning algorithm, that is, the attribute information set of each text box is $(p_i, I_i, c_i)$.

Alternatively, in an embodiment of the present disclosure, the relationship information set $(d_{ij}, r_{ij}, u_{ij})$ between each text box and the other text box may be determined based on the attribute information set of each text box according to the following formulas (1)-(3):

$$d_{ij}=p_i-p_j \qquad (1)$$

$$r_{ij}=\text{rot}(p_i,p_j) \qquad (2)$$

$$u_{ij}=\text{Euclidean}(p_i,p_j) \qquad (3)$$

Here, $p_i$ is the position coordinates of the $i^{th}$ text box; $p_j$ is the position coordinates of the $j^{th}$ text box; $d_{ij}$ is the position coordinate difference of the four corner points between the $i^{th}$ text box and the $j^{th}$ text box; $r_{ij}$ is the center point angle difference between the $i^{th}$ text box and the $j^{th}$ text box, and $r_{ij} \in [-\pi, \pi]$; rot( ) is an angle difference calculation function; $u_{ij}$ is the center point Euclidean distance between the $i^{th}$ text box and the $j^{th}$ text box; and Euclidean( ) is a calculate function for Euclidean distance.

S102, determining a type of the text box and an associated text box that has a structural relationship with the text box based on the attribute information set and the relationship information set of the text box.

In an embodiment of the present disclosure, a bill structure may be predefined, that is, defining the type of the text box as type of the text string in the text box, which may include field attribute type K, field value type V, table header type H, or table cell type C. Text boxes of the field attribute type K and the field value type V have a field structural relationship R; and text boxes of the table header type H and the table cell type C have a table structural relationship M. Based on this definition, an embodiment of the present disclosure may define an undirected graph for the bill image, $G=(Y, E)$, where each text box represents a vertex Y in the undirected graph, and the type of the text box belongs to one of K, V, H or C. If two vertices ($Y_i$ and $Y_j$) in the undirected graph have a structural relationship, for example, the types of $Y_i$ and $Y_j$ are K and V, or H and C, then a corresponding edge E of the two vertices ($Y_i$ and $Y_j$) belongs to the field structural relationship R or the table structural relationship M. Based on the undirected graph, it is defined (Yi,Yj)=(Yj, Yi), the association probability $A_{ij}$ may be calculated for pairwise different vertices $Y_i$ and $Y_j$ (i.e., pairwise different text boxes) of the undirected graph, where $A_{ij} \in \{0, 1\}$. If $A_{ij}=1$, it indicates that there is a structural relationship between the two vertices $Y_i$ and $Y_j$, when $A_{ij}=0$, it indicates that there is no structural relationship between the two vertices $Y_i$ and $Y_j$. Since G is an undirected graph, based on the text boxes in the bill image, a relationship probability between pairwise different text boxes may be represented by a two-dimensional probability matrix, and the two-dimensional probability matrix is a symmetric matrix, that is:

$$A_{ij} = \begin{cases} 1 & \text{if } i \neq j \text{ and } (Y_i, Y_j) \in E, E \in (R \cup M) \\ 0 & \text{other} \end{cases}.$$

Alternatively, in an embodiment of the present disclosure, on the basis of the bill structure defined above, it is determined which type of the K, V, H, and C defined above the text box belongs to, and the associated text box that has a table structural relationship or a field structural relationship with the text box, based on the attribute information set of each text box and the relationship information set of the text box with another text box in the bill image.

The specific implementation may be based on a preset inference algorithm to analyze the attribute information set of each text box and the relationship information set between the text box and the other text box, infer the type of the text box, and infer the associated text box having a table structural relationship or a field structural relationship with the text box in the bill image. It may also be that the attribute information set of each text box and the relationship information set between each text box and the other text box in the bill image are inputted into a pre-trained inference model. The inference model may analyze the attribute information set and the relationship information set based on the deep learning algorithm, and output the type of each text box and the associated text box that has a structural relationship with each text box.

For example, FIG. 1C shows a visual effect diagram of text box type and structural relationship labeled after inference in a bill image. In the figure, the text box type corresponding to a right-angled solid line box is the field attribute type K; the text box type corresponding to a right-angled dashed line box is the field value type V; the text box type corresponding to a rounded solid line box is the table header type H; and the text box type corresponding to a rounded dashed line box is the table cell type C. For each text box, it is connected with an associated text box by a straight line, for example, there is a field structural relationship between the connection of the text box "name" of the field attribute type and the text box "Zhang San" of the field value type; and the connection of the text box "charged items" of the table header type and the text box "western medicine fee" of the table cell type.

It should be noted that for the field structural relationship, a text box of the field attribute type corresponds to a text box of the field value type; for the table structural relationship, a text box of the table header type may correspond to at least one text box of the table cell type, but a text box of the table cell type only corresponds to a text box of the table header type. Compared with the solution in the existing technology that extracts bill data at a fixed position based on a template, the solution of embodiments of the present disclosure determines the types of the text boxes and the structural relationship between the text boxes by inference, even if bill data is printed out of place, the solution may also accurately determine the structural relationship between the text boxes. For example, as shown in FIG. 1C, "payee" and "92974" are printed out of place in the bill data, but a field structural relationship between the two may be accurately indicated.

S103, extracting structured bill data of the bill image, based on the type of the text box and the associated text box that has the structural relationship with the text box.

Alternatively, after the above operation of S102, the type of each text box in the bill image and the associated text box having the structural relationship with each text box may be obtained. In this regard, text content in each set of two text boxes having a structural relationship may be extracted as a set of structured bill data. For example, as shown in FIG. 1C, the content in each solid line right-angle box and the dotted line right-angle box connected thereto is used as a set of field structure bill data, such as "business serial number" and "2540000" are a set of field structure bill data, and "business serial number" is the field attribute type, and "2540000" is the field value type; and the content in each solid line rounded box and the dotted line rounded box connected thereto is used as a set of table structure bill data, such as "charged items" and "western medicine fee" are a set of table structure bill data, and "charged items" is the table header type, and "western medicine fee" is the table unit type.

The technical solution of embodiments of the present disclosure, detects the attribute information set and the relationship information set of the text box in the bill image to infer the type of the text box and the associated text box that has an associated relationship with the text box, thereby extracting the structured bill data from the bill image. The solution of embodiments of the present disclosure may accurately infer structured bill data having a field structural relationship and a table structural relationship in a bill image without template position matching. The solution is not limited by bill format, can support automatic recognition of a variety of bill images in different formats, and the recognition process does not require use of a template, which improves the versatility and accuracy of bill image recognition.

FIG. 2 is a flowchart of another method for recognizing a bill image according to an embodiment of the present disclosure. The present embodiment is further optimized on the basis of the above embodiment, and provides a specific situation of determining a type of the text box and an associated text box that has a structural relationship with the text box based on the attribute information set and the relationship information set of the text box. As shown in FIG. 2, the method includes following steps.

S201, performing text detection on a bill image, and determining an attribute information set and a relationship information set of each text box of at least two text boxes in the bill image.

S202, determining an attribute feature set and a relationship feature set of the text box based on the attribute information set and the relationship information set of the text box.

In an embodiment of the present disclosure, the attribute feature set of the text box may be related features extracted from attribute information of the text box and used to represent the attribute information of the text box. Similarly, relationship features of the text box may be related features extracted from the relationship information set of the text box and used to represent relationship information of the text box.

Alternatively, in an embodiment of the present disclosure, the determining the attribute feature set and the relationship feature set of the text box based on the attribute information set and the relationship information set of the text box, may be based on a preset feature extraction algorithm to analyze the attribute information sets and the relationship information sets of all the text boxes in the bill image, to extract the attribute feature sets that may represent attributes of the text boxes, and the relationship feature sets that label relationships of the text boxes. Alternatively, the attribute information set and the relationship information set of the text box determined in S201 are inputted into a feature extraction network of a pre-trained inference model. The feature extraction network may analyze the attribute information set and the relationship information set of the text box based on the deep learning algorithm, to output the attribute feature set and the relationship feature set of the text box.

S203, determining a type probability of the text box and a relationship probability between different text boxes, based on the attribute feature set and the relationship feature set of the text box.

In an embodiment of the present disclosure, the type probability of the text box may be a probability that the text box belongs to a predefined field attribute type, field value type, table header type, and table cell type. The relationship probability between different text boxes may be a probability that there is a structural relationship between two different texts, and the structural relationship may be the field structural relationship or the table structural relationship. Alternatively, in an embodiment of the present disclosure, the determining the relationship probability between different text boxes may be to predict whether there is a relationship between the different text boxes, but not to predict which structural relationship there is.

Alternatively, in an embodiment of the present disclosure, the determining the type probability of the text box, based on the attribute feature set and the relationship feature set of the text box, may be based on a preset type probability prediction algorithm to analyze the attribute feature set and the relationship feature set of the text box, to predict the probabilities that the text box belongs to the defined four types (i.e., the field attribute type, the field value type, the table header type and the table cell type). Based on a preset structural relationship prediction algorithm, the attribute feature set and the relationship feature set of each text box are analyzed, to predict a probability value of structural relationship between two different text boxes in the bill image. It may also be that the attribute feature set and the relationship feature set of the text box determined in S202 are inputted into a probability prediction network of the pre-trained inference model. The probability prediction network may analyze the attribute feature set and the relationship feature set of the text box based on the deep learning algorithm, and output the probabilities that the text boxes in the bill image belongs to the defined four types, and the probability value of structural relationship between two different text boxes in the bill image. In this embodiment of the present disclosure, the operation of this step is performed by the probability prediction network trained with massive sample data, which may improve the type probability of the text box and the accuracy of determining a relationship probability between different text boxes.

S204, determining a type of the text box and an associated text box that has a structural relationship with the text box, based on the type probability of the text box and the relationship probability between different text boxes.

Alternatively, in an embodiment of the present disclosure, the type of the text box may be determined based on the type probability of the text box. S203 predicts the probabilities that the text boxes in the bill image belong to the defined four types. In this regard, for each text box, a type corresponding to the highest probability may be determined as the type of the text box among the probabilities of the four types. For example, if the probabilities that a text box belongs to the field attribute type, the field value type, the table header type, and the table cell type are 0.1, 0.05, 0.08, and 0.77 respectively, then it may be determined that the type of the text box is the table cell type.

Alternatively, in an embodiment of the present disclosure, the determining the associated text box that has a structural relationship with the text box include: determining a candidate text box pair having a structural relationship, based on the relationship probability between different text boxes and a probability threshold; and determining the associated text box that has a structural relationship with the text box, based on the candidate text box pair and the type of the text box. The relationship probability between different text boxes represents a probability that the different text boxes have a structural relationship. The higher the probability value, the greater the possibility of a structural relationship between the two, and each relationship probability corresponds to two different text boxes. Therefore, in an embodiment of the present disclosure, a relationship probability threshold for measuring whether the text boxes have a structural relationship may be set in advance, such as 80%, and then from all the relationship probabilities between different text boxes predicted in S203, a relationship probability that is greater than the probability threshold is selected, and two text boxes corresponding to the selected relationship probability that is greater than the probability threshold are used as a set of candidate text box pair. Then, based on the determined types of the text boxes, it is determined whether the types of the two text boxes in each candidate text box pair belong to the table structure type or the field structure type. If the types of the two text boxes in each candidate text box pair belong to the table structure type or the field structure type, these two text boxes are used as each other's associated text boxes. For example, as shown in FIG. 1B, assuming that the relationship probability between the text box "name" and the text box "Zhang San" is 92%, and the relationship probability between the text box "name" and the text box "western medicine fee" is 85%. Since 92% and 85% are both greater than a probability threshold of 80%, in this regard, the text box "name" and the text box "Zhang San" may be used as a set of candidate text boxes, and the text box "name" and the text box "western medicine fee" may also be used as a set of candidate text boxes. Because the type of the text box "name" is the field attribute type, the type of the text box "Zhang San" is the field value type, and the type of the text box "western medicine fee" is the table cell type, the field attribute type and the field value type correspond to a field structural relationship, it may be determined that the associated text box of the text box "name" is the text box "Zhang San", and the associated text box of the text box "Zhang San" is the text box "name".

S205, extracting structured bill data of the bill image, based on the type of the text box and the associated text box that has the structural relationship with the text box.

The technical solution of this embodiment of the present disclosure, through detecting the attribute information set and the relationship information set of the text box in the bill image, first extracts the attribute feature set and the relationship feature set of the text box, predicts the type probability of the text box and the relationship probability of structural relationship between different text boxes based on the extracted attribute feature set and relationship feature set of the text box, and then infers the type of the text box and the associated text box that has an association relationship with the text box based on the type probability and the relationship probability, so as to extract the structured bill data from the bill image. The solution of embodiments of the present disclosure infers the type of each text box and the associated text box by feature extraction and probability prediction, and inferring the text box type and the associated text box improves the accuracy of determining the text box type and the associated text box, ensuring that the present disclosure may accurately recognize a bill and complete extraction of bill data without using a template.

Figure 3A:
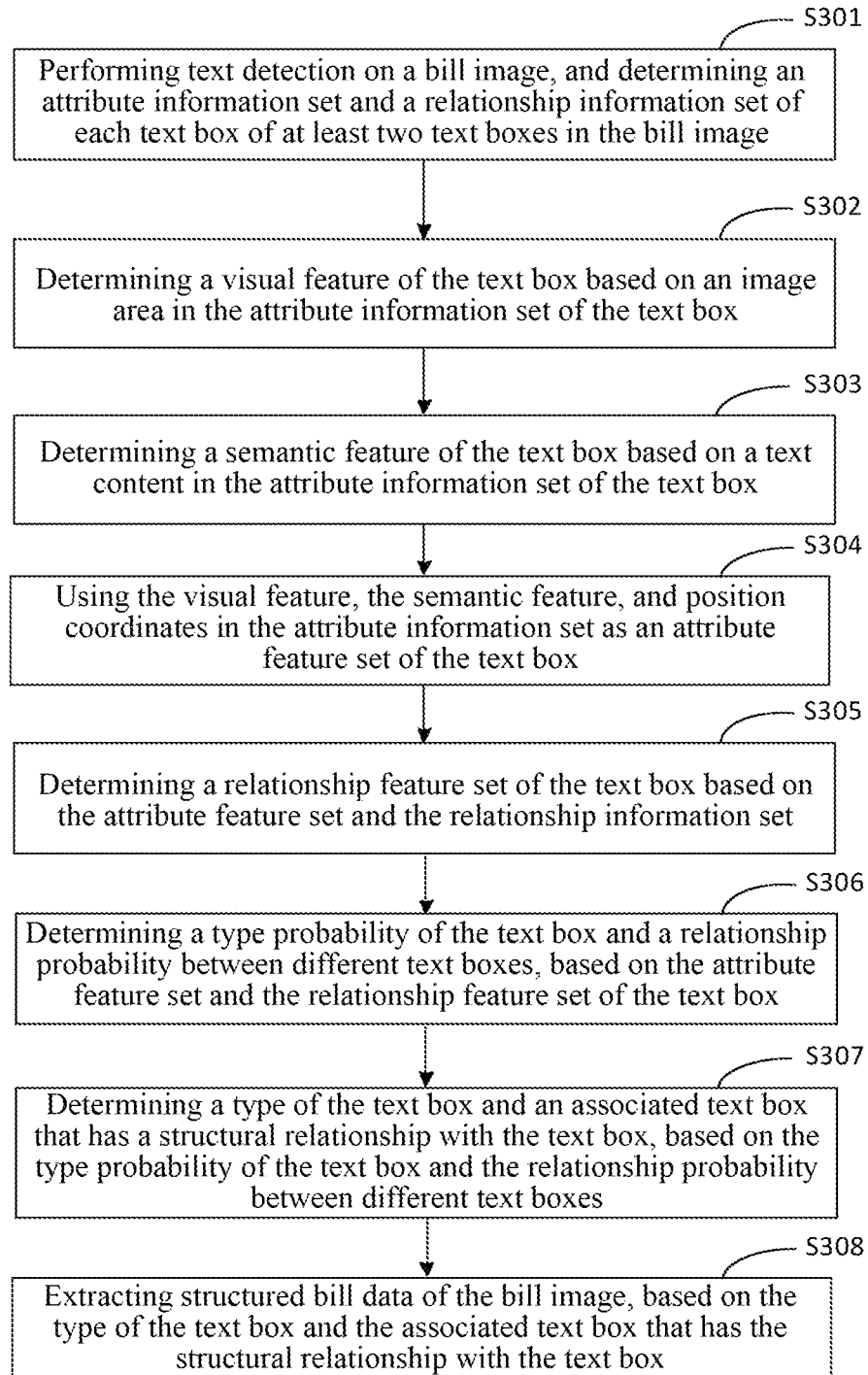
FIG. 3A is a flowchart of another method for recognizing a bill image according to an embodiment of the present disclosure.
Figure 3B:
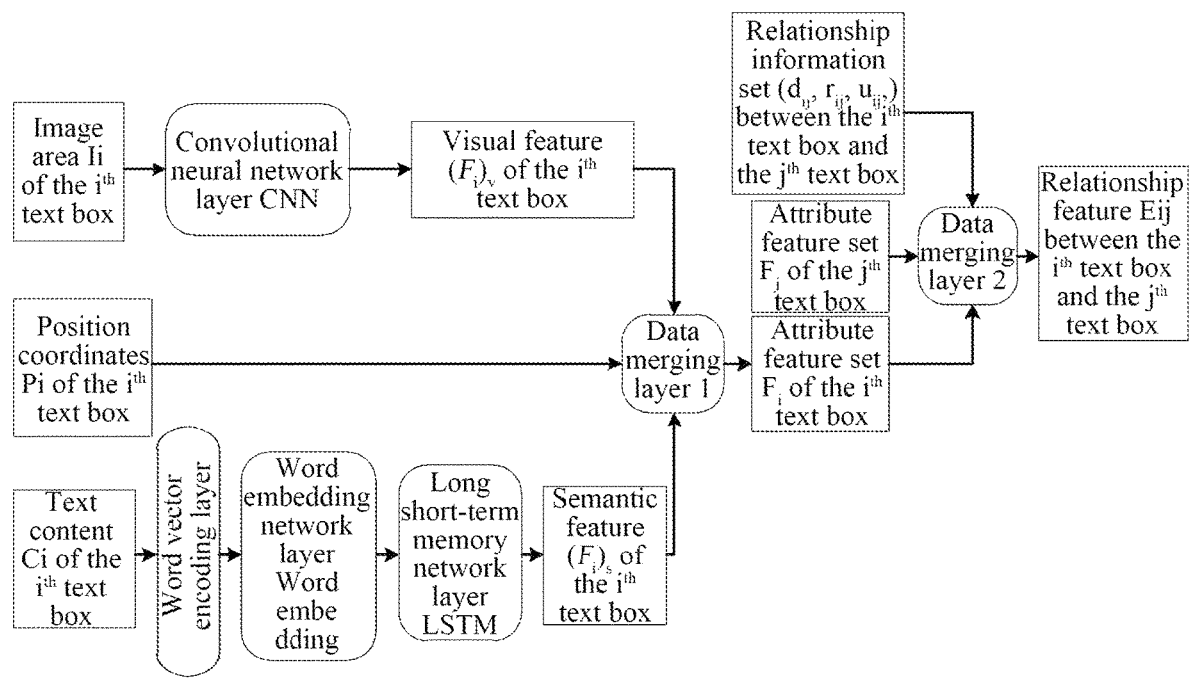
FIG. 3B is a schematic diagram of an operating principle of a feature recognition network according to an embodiment of the present disclosure.

FIG. 3A is a flowchart of another method for recognizing a bill image according to an embodiment of the present disclosure. FIG. 3B is a schematic diagram of an operating principle of a feature recognition network according to an embodiment of the present disclosure. The present embodiment is further optimized on the basis of the above embodiments, and provides a specific situation of determining an attribute feature set and a relationship feature set of the text box based on the attribute information set and the relationship information set of the text box. As shown in FIGS. 3A-3B, the method includes following steps.

S301, performing text detection on a bill image, and determining an attribute information set and a relationship information set of each text box of at least two text boxes in the bill image.

S302, determining a visual feature of the text box based on an image area in the attribute information set of the text box.

Alternatively, since the visual feature of the text box is a feature extracted from the corresponding image area of the text box in the bill image, this step may be to extract the image area of the text box from the attribute information set of the text box determined in S301, and analyze the image area to determine the visual feature of the text box.

Alternatively, if this embodiment of the present disclosure determines relevant features (that is, the attribute feature set and the relationship feature set) of the text box based on a feature extraction algorithm, then this step may be based on a preset image feature extraction algorithm to perform feature extraction on the image area of each text box to obtain the visual feature corresponding to each image area. If this embodiment of the present disclosure determines the relevant features of the text box based on a feature extraction network, then this step may be determining the visual feature of the text box based on a visual feature extraction layer in the feature extraction network. Specifically, the image area in the attribute information set of the text box may be inputted into the visual feature extraction layer to obtain the visual feature of the text box. Alternatively, the visual feature extraction layer includes at least a convolutional neural network layer. For example, as shown in FIG. 3B, for the $i^{th}$ text box, image area Ii in the attribute information set of the text box may be inputted into the CNN layer of the feature extraction network to obtain the visual feature $(F_i)_v$ of the $i^{th}$ text box.

S303, determining a semantic feature of the text box based on a text content in the attribute information set of the text box.

Alternatively, since the semantic feature of the text box is a feature extracted from the text content in the text box, this step may be to extract the text content of the text box from the attribute information set of the text box determined in S301, and then code the text content into a text vector sequence for analysis, thereby determining the semantic feature of the text box. There are many methods for coding a text content into a text vector sequence in an embodiment of the present disclosure. For example, the text content may be coded into a text vector sequence by looking up a dictionary.

Alternatively, if this embodiment of the present disclosure determines the relevant features (that is, the attribute feature set and the relationship feature set) of the text box based on the feature extraction algorithm, then in this regard, the text content of the text box may be first coded into a text vector sequence, and then feature extraction is performed on the text vector sequence of the text box based on a preset text feature extraction algorithm to obtain the semantic feature of the text box. If this embodiment of the present disclosure determines the relevant features of the text box based on the feature extraction network, then this step may include determining the semantic feature of the text box based on a semantic feature extraction layer in the feature extraction network. Specifically, the text content in the attribute information set of the text box may be inputted into the semantic feature extraction layer to obtain semantic features of text fragments. Alternatively, the semantic feature extraction layer includes at least a word vector encoding layer, a word embedding network layer, and a long short-term memory network layer. For example, as shown in FIG. 3B, for the $i^{th}$ text box, text content $c_i$ in the attribute information set of the text box may be used as an input of the word vector encoding layer to obtain a text word vector sequence and the text word vector sequence is inputted into the word embedding network layer (word embedding). An output result is obtained and then inputted into the long short-term memory network layer LSTM to obtain the semantic feature $(F_i)_s$ of the $i^{th}$ text box.

S304, using the visual feature, the semantic feature, and position coordinates in the attribute information set as an attribute feature set of the text box.

Alternatively, in this embodiment of the present disclosure, the visual feature and the semantic feature of the text box extracted in S302-S303, and the position coordinates in the attribute information set of the text box may be combined to obtain the attribute feature set of the text box.

Alternatively, if this embodiment of the present disclosure determines the relevant features of the text box based on the feature extraction network, then this step may be to combine the visual feature, the semantic feature and the position coordinates to obtain the attribute feature set of the text box based on a first data merging layer in the feature extraction network. For example, as shown in FIG. 3B, the visual feature $(F_i)_v$, semantic feature $(F_i)_s$ of the $i^{th}$ text box, and the position coordinate $p_i$ of the $i^{th}$ text box are inputted into the data merging layer 1, and the input data are combined by the data merging layer 1 to obtain the attribute feature set Fi of the $i^{th}$ text box, i.e., $F_i=(p_i, (F_i)_v, (F_i)_s)$.

S305, determining a relationship feature set of the text box based on the attribute feature set and the relationship information set.

Alternatively, in an embodiment of the present disclosure, the relationship feature set of the text box is determined based on the attribute feature set and the relationship information set. Specifically, the attribute feature set of each text box is added into each corresponding relationship information set to obtain the relationship feature set of the text box. For example, assuming that the attribute feature set of the $i^{th}$ text box is $F_i$, the attribute feature set of the $j^{th}$ text box is $F_j$, and the relationship information set between the $i^{th}$ text box and the $j^{th}$ text box is $(d_{ij}, r_{ij}, u_{ij})$ then the relationship feature set between the $i^{th}$ text box and the $j^{th}$ text box is $(F_i, F_j, d_{ij}, r_{ij}, u_{ij})$.

Alternatively, if this embodiment of the present disclosure determines the relevant features of the text box based on the feature extraction network, then this step may be to combine the attribute feature sets of two different text boxes and the relationship information set between the two different text boxes based on a second data merging layer in the feature extraction network to obtain the relationship feature set of the two different text boxes. For example, as shown in FIG. 3B, the attribute feature set $F_i$ of the $i^{th}$ text box, the attribute feature set $F_j$ of the $j^{th}$ text box and the relationship information set ($d_{ij}$, $r_{ij}$, $u_{ij}$) between the $i^{th}$ text box and the $j^{th}$ text box are inputted into the data merging layer 2, and the input data are combined by the data merging layer 2 to obtain the relationship feature set between the $i^{th}$ text box and the $j^{th}$ text box, $E_{ij}$.

S306, determining a type probability of the text box and a relationship probability between different text boxes, based on the attribute feature set and the relationship feature set of the text box.

S307, determining a type of the text box and an associated text box that has a structural relationship with the text box, based on the type probability of the text box and the relationship probability between different text boxes.

S308, extracting structured bill data of the bill image, based on the type of the text box and the associated text box that has the structural relationship with the text box.

The technical solution of this embodiment of the present disclosure determines the visual feature and the semantic feature of each text box respectively based on the image area and the text content of the text box detected in the bill image, then uses the visual feature, the semantic feature and the position coordinates of the text box as the attribute feature set of the text box, adds the attribute feature set to the corresponding relationship information set to obtain the relationship feature set of the text box; and predicts the type probability of the text box and the relationship probability of structural relationship between different text boxes based on the extracted attribute feature set and relationship feature set of the text box, then infers the type of the text box and the associated text box that has an association relationship with the text box, so as to extract the structured bill data from the bill image. When extracting the attribute feature set and the relationship feature set of the text box, the solution of embodiments of the present disclosure considers multi-dimensionality from such as visual feature, semantic feature, and position relationship, so that the extracted attribute feature set and relationship feature set are more accurate, further improving the accuracy of determining the text box type and the associated text box, ensuring that the present disclosure may accurately recognize a bill and complete extraction of bill data without using a template.

Figure 4A:
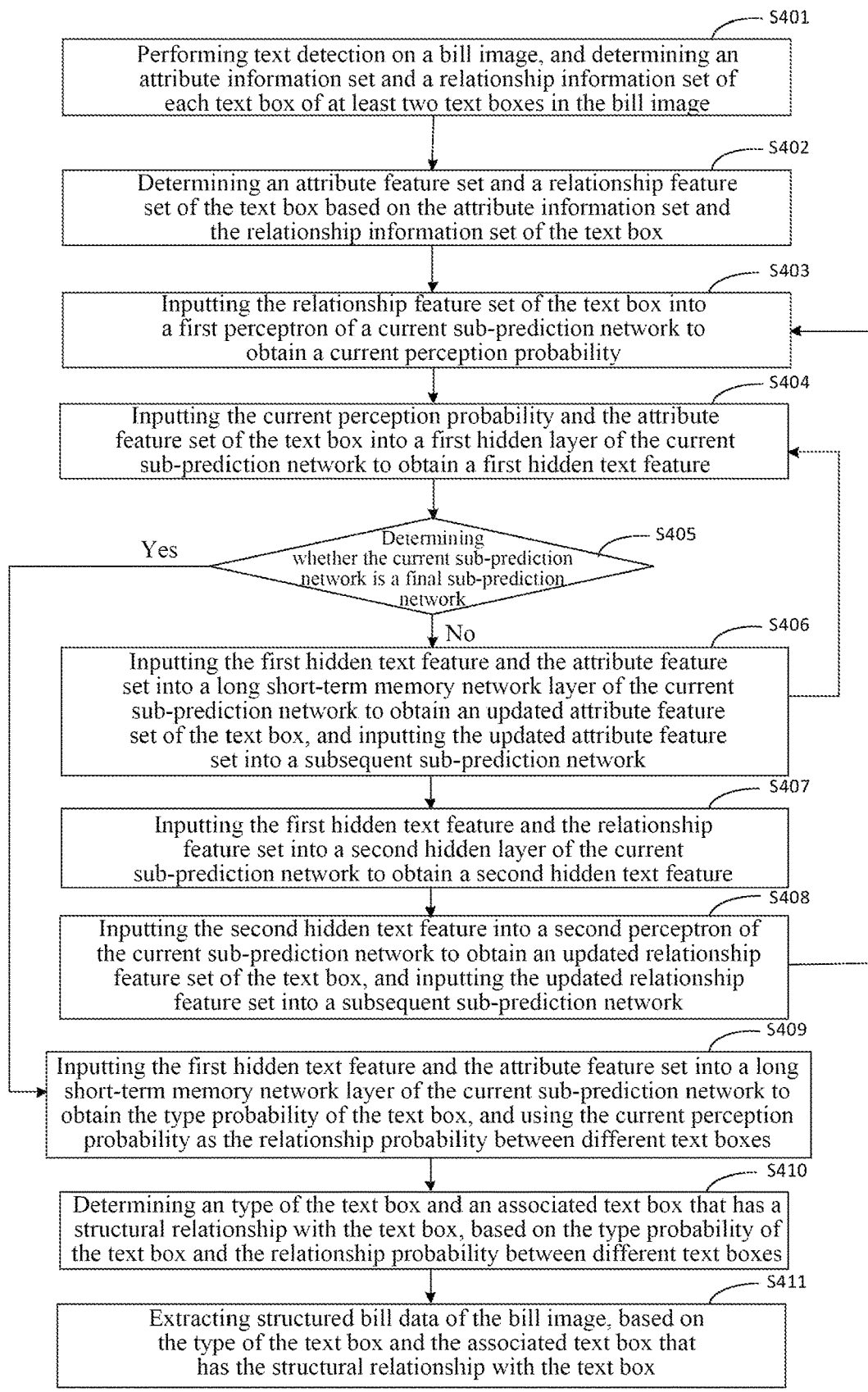
FIG. 4A is a flowchart of another method for recognizing a bill image according to an embodiment of the present disclosure.
Figure 4B:
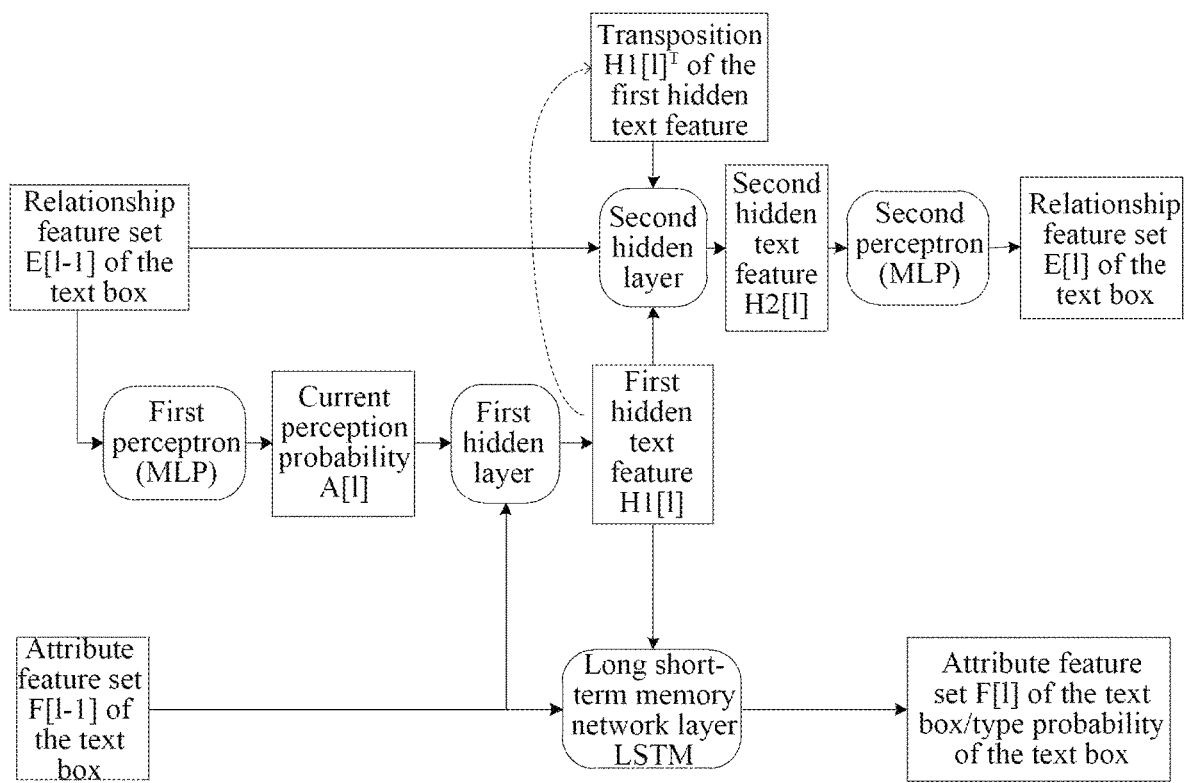
FIG. 4B is a schematic diagram of an operating principle of a sub-prediction network according to an embodiment of the present disclosure.

FIG. 4A is a flowchart of another method for recognizing a bill image according to an embodiment of the present disclosure. FIG. 4B is a schematic diagram of an operating principle of a sub-prediction network according to an embodiment of the present disclosure. The present embodiment is further optimized on the basis of the above embodiments, and provides a specific situation of inputting the attribute feature set and the relationship feature set of the text box into a probability prediction network to obtain the type probability of the text box and the relationship probability between different text boxes.

It should be noted that the probability prediction network of embodiments of the present disclosure is obtained by training in advance using a large amount of sample data, and the probability prediction network may be composed of at least one sub-prediction network connected end to end. FIG. 4B shows a schematic diagram of an operating principle of a sub-prediction network. If the prediction network in the embodiments of present disclosure is composed of a plurality of sub-prediction networks, an output result of a first perceptron (MLP) of each sub-prediction network is used as an input of a first perceptron MLP of the subsequent sub-prediction network; and an output result of long short-term memory network layer (LSTM) of each sub-prediction network is used as an input of long short-term memory network layer (LSTM) and a first hidden layer of the subsequent sub-prediction network.

Specifically, as shown in FIGS. 4A-4B, the method includes following steps.

S401, performing text detection on a bill image, and determining an attribute information set and a relationship information set of each text box of at least two text boxes in the bill image.

S402, determining an attribute feature set and a relationship feature set of the text box based on the attribute information set and the relationship information set of the text box.

S403, inputting the relationship feature set of the text box into a first perceptron of a current sub-prediction network to obtain a current perception probability.

In an embodiment of the present disclosure, the current sub-prediction network may be a sub-prediction network currently operating in the probability prediction network, which may be any sub-prediction network in the probability prediction network.

Alternatively, as shown in FIG. 4B, in this embodiment of the present disclosure, the relationship feature set E[l−1] of the text box outputted by a second perceptron (MLP) of a previous sub-prediction network l−1 of the current sub-prediction network l may be inputted into the first perceptron (MLP) of the current sub-prediction network l. The first perceptron (MLP) may perform multi-layer perception on the relationship feature set E[l−1] of the text box to obtain the current perception probability. Alternatively, the current perception probability is the relationship probability between different text boxes as perceived by the current sub-prediction network.

Alternatively, if the current sub-prediction network is a first sub-prediction network of the probability prediction network, then in this regard, the relationship feature set of the text box inputted into the first perceptron of the current sub-prediction network may be the relationship feature set of the text box of the bill image determined in S402.

S404, inputting the current perception probability and the attribute feature set of the text box into a first hidden layer of the current sub-prediction network to obtain a first hidden text feature.

Alternatively, in this embodiment of the present disclosure, the attribute feature set F[l−1] of the text box outputted by LSTM of the previous sub-prediction network l−1 of the current sub-prediction network l, and the current perception probability outputted by the first perceptron (MLP) of the current sub-prediction network l may be inputted into the first hidden layer of the current sub-prediction network l. The first hidden layer may perform calculation on the inputted attribute feature set F[l−1] and the current perception probability, such as multiplication, to obtain the first hidden text feature H1[l].

Alternatively, if the current sub-prediction network is the first sub-prediction network of the probability prediction network, then in this regard, the attribute feature set of the text box inputted into the first hidden layer of the current sub-prediction network may be the attribute feature set of the text box of the bill image determined in S402.

S405, determining whether the current sub-prediction network is a final sub-prediction network, if the current sub-prediction network is not the final sub-prediction network, performing S406, if the current sub-prediction network is the final sub-prediction network, performing S409.

Alternatively, in an embodiment of the present disclosure, if the current sub-prediction network is not the final sub-prediction network, it indicates that the current sub-prediction network does not need to give the final type probability of the text box and the relationship probability between different text boxes. In this regard, the current sub-prediction network may perform the operations of S406-S408 to obtain the attribute feature set and the relationship feature set analyzed by the present sub-prediction network based on its own internal network layers, and input the obtained attribute feature set and the relationship feature set into the subsequent sub-prediction network. If the current sub-prediction network is the final sub-prediction network, the current sub-prediction network needs to perform the operation of S409 to predict the type probability of the text box and the relationship probability of different text boxes.

S406, inputting the first hidden text feature and the attribute feature set into the long short-term memory network layer of the current sub-prediction network to obtain an updated attribute feature set of the text box, and inputting the updated attribute feature set into a subsequent sub-prediction network.

Alternatively, if the current sub-prediction network l is not the final sub-prediction network, the first hidden text feature H1[l] outputted by the first hidden layer of the current sub-prediction network l, and the attribute feature set F[l−1] of the text box outputted by LSTM of the previous sub-prediction network l−1 of the current sub-prediction network l are inputted into LSTM of the current sub-prediction network l. The LSTM of the current sub-prediction network l may update the input attribute feature set F[l−1] of the text box based on the deep learning algorithm to obtain the attribute feature set F[l] of the text box and the attribute feature set F[l] may be inputted into the subsequent sub-prediction network l+1 of the current sub-prediction network l. That is, the attribute feature set F[l] may be inputted into the first hidden layer and LSTM of the subsequent sub-prediction network l+1 respectively.

Alternatively, if the current sub-prediction network is the first sub-prediction network of the probability prediction network, then in this regard, the attribute feature set of the text box inputted into the long short-term memory network layer of the current sub-prediction network may be the attribute feature set of the text box of the bill image determined in S402.

S407, inputting the first hidden text feature and the relationship feature set into a second hidden layer of the current sub-prediction network to obtain a second hidden text feature.

Alternatively, if the current sub-prediction network l is not the final sub-prediction network, the relationship feature set E[l−1] of the text box outputted by a second perceptron (MLP) of the previous sub-prediction network l−1 of the current sub-prediction network l, the first hidden text feature H1[l] outputted by the first hidden layer of the current sub-prediction network l, and a transposition H1[l]$^T$ of the first hidden text feature need to be inputted into the second hidden layer of the current sub-prediction network l. The second hidden layer may perform calculation on the input relationship feature set E[l−1], the first hidden text feature H1[l] and the transposition H1[l]$^T$, such as three-term matrix multiplication, to obtain the second hidden text feature H2[l].

Alternatively, if the current sub-prediction network is the first sub-prediction network of the probability prediction network, then in this regard, the relationship feature set of the text box inputted into the second hidden layer of the current sub-prediction network may be the relationship feature set of the text box of the bill image determined in S402.

S408, inputting the second hidden text feature into a second perceptron of the current sub-prediction network to obtain an updated relationship feature set of the text box, and inputting the updated relationship feature set into a subsequent sub-prediction network.

Alternatively, in this embodiment of the present disclosure, the second hidden text feature H2[l] obtained by the second hidden layer of the current sub-prediction network l may be inputted into the second perceptron (MLP) of the current sub-prediction network l. The second perceptron may perform multi-layer perception on the second hidden text feature H2[l] to obtain the updated relationship feature set E[l] of the current sub-prediction network l, and input the relationship feature set E[l] into the subsequent sub-prediction network l+1 of the current sub-prediction network l. That is, the relationship feature set E[l] may be inputted into the first perceptron (MLP) of the subsequent sub-prediction network l+1.

It should be noted that the subsequent sub-prediction network l+1 of the current sub-prediction network l may also operate according to the method described in S403-S409 in this embodiment of the present disclosure until the final sub-prediction network predicts the type probability of the text box and the relationship probability between different text boxes.

S409, inputting the first hidden text feature and the attribute feature set into a long short-term memory network layer of the current sub-prediction network to obtain the type probability of the text box, and using the current perception probability as the relationship probability between different text boxes.

Alternatively, if the current sub-prediction network l is the final sub-prediction network, the current sub-prediction network l needs to predict the type probability of the text box and the relationship probability between different text boxes. In this regard, the first hidden text feature H1[l] outputted by the first hidden layer of the current sub-prediction network l and the attribute feature set F[l−1] of the text box outputted by LSTM of the previous sub-prediction network l−1 of the current sub-prediction network l may be inputted into LSTM of the current sub-prediction network l. The LSTM may analyze the input data based on the deep learning algorithm, to obtain the probabilities that the text box belongs to the defined four types (i.e., the field attribute type, the field value type, the table header type and the table cell type). Regarding the relationship probability between different text boxes, in the present embodiment, the current perception probability outputted by the first perceptron (MLP) of the final sub-prediction network may be determined as the final predicted relationship probability between different text boxes.

It should be noted that a network structure of the final sub-prediction network is the same as that of the other sub-prediction networks, but after training, a function of the long short-term memory network layer of the final sub-prediction network is different from that of the other sub-prediction networks. The function of the long short-term memory network layer of the final sub-prediction network is to predict the type probability of the text box, and the function of the long short-term memory network layer of the other sub-prediction networks is to update the attribute feature set of the text box.

S410, determining a type of the text box and an associated text box that has a structural relationship with the text box, based on the type probability of the text box and the relationship probability between different text boxes.

S411, extracting structured bill data of the bill image, based on the type of the text box and the associated text box that has the structural relationship with the text box.

The technical solution of embodiments of the present disclosure, after detecting the attribute information set and the relationship information set of the text box based on the bill image and extracting the attribute information set and the relationship information set of the text box, forms the probability prediction network based on at least one sub-prediction network connected end-to-end, to predict and extract the type probability of the text box and the relationship probability of structural relationship between different text boxes, thereby inferring the type of the text box and the associated text box that has a structural relationship with the text box, realizing extracting the structured bill data from the bill image. The solution of embodiments the present disclosure predicts the type probability of the text box and the relationship probability between text boxes based on the multi-layer end-to-end sub-prediction networks, which greatly improves the accuracy of prediction results and lays a foundation for accurately determining the text box type and the associated text box, and ensures the accuracy of bill image recognition and bill data extraction.

Figure 5:
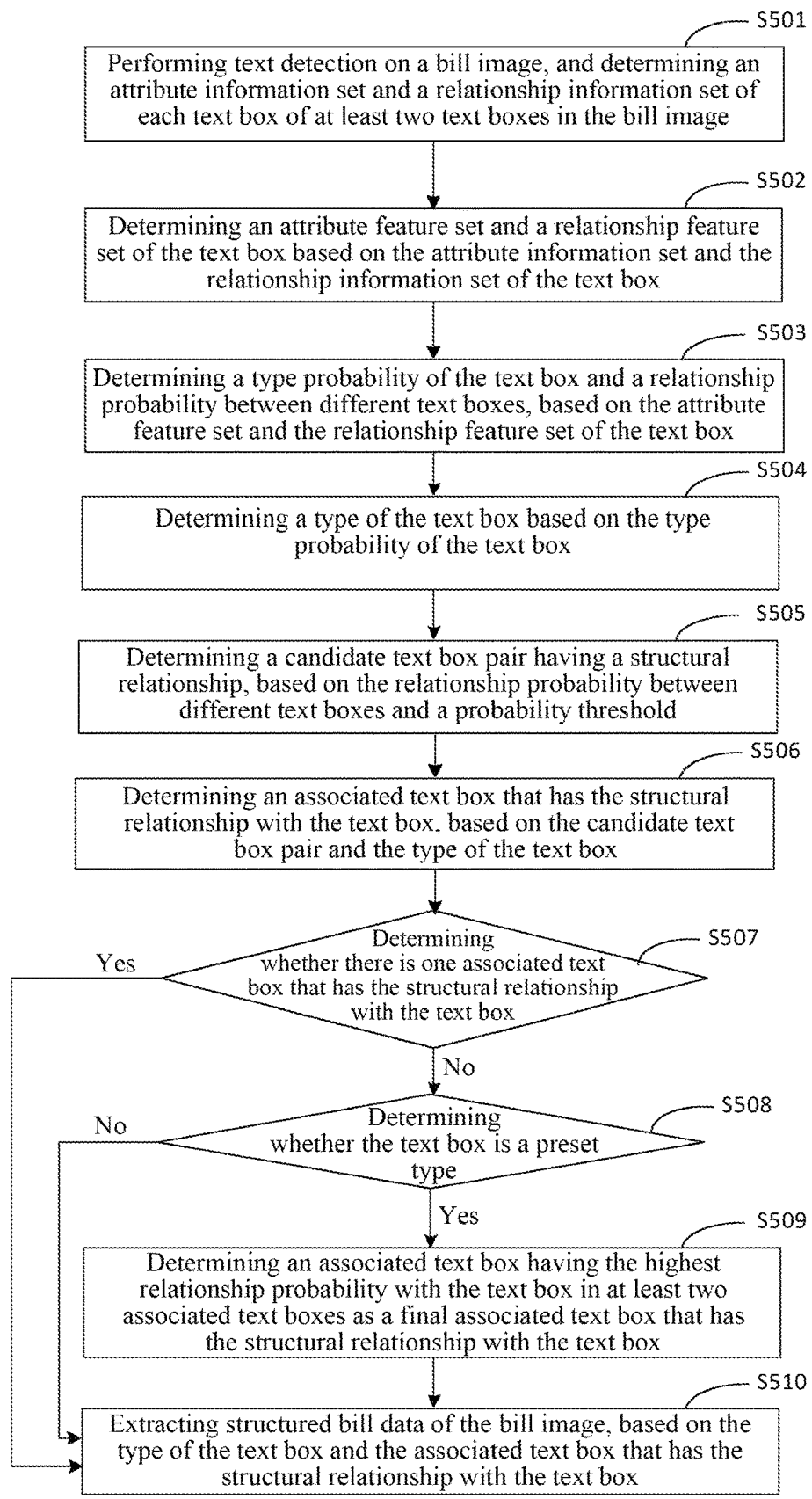
FIG. 5 is a flowchart of another method for recognizing a bill image according to an embodiment of the present disclosure.

FIG. 5 is a flowchart of another method for recognizing a bill image according to an embodiment of the present disclosure. The present embodiment is further optimized on the basis of the above embodiments, and provides a specific situation of determining the type of the text box and the associated text box that has a structural relationship with the text box, based on the type probability of the text box and the relationship probability between different text boxes. As shown in FIG. 5, the method includes following steps.

S501, performing text detection on a bill image, and determining an attribute information set and a relationship information set of each text box of at least two text boxes in the bill image.

S502, determining an attribute feature set and a relationship feature set of the text box based on the attribute information set and the relationship information set of the text box.

S503, determining a type probability of the text box and a relationship probability between different text boxes, based on the attribute feature set and the relationship feature set of the text box.

S504, determining a type of the text box based on the type probability of the text box.

Alternatively, S503 determines the type probability of the text box in the bill image. In this regard, for each text box, a type corresponding to the highest probability among the probabilities of the four types may be determined as the type of the text box. For example, based on the type probabilities of the text boxes in FIG. 1B, the types of the text boxes are determined. Then, a text box of the field attribute type K is labeled as a right-angled solid line box; a text box of the field value type V is labeled as a right-angled dashed line box; a text box of the table header type H is labeled as a rounded solid line box; and a text box of the table cell type C is labeled as a rounded dashed line box, and a visual effect is as shown in FIG. 1C.

S505, determining a candidate text box pair having a structural relationship, based on the relationship probability between different text boxes and a probability threshold.

S506, determining an associated text box that has the structural relationship with the text box, based on the candidate text box pair and the type of the text box.

S507, determining whether there is one associated text box that has the structural relationship with the text box, if the number of associated text box that has the structural relationship with the text box is not one, performing S508, if the number of associated text box that has the structural relationship with the text box is one, performing S510.

Alternatively, in S506, in the associated text box determined for the text box, there may be the case that one text box has a plurality of associated text boxes. In order to prevent misjudgment for the plurality of associated text boxes, embodiments of the present disclosure may determine whether the number of associated text box that has the structural relationship with the text box determined in S506 is one, for each text box in sequence. If the number of associated text box that has the structural relationship with the text box determined in S506 is one, S510 is performed to extract the structured bill data of the bill image. If the number of associated text box that has the structural relationship with the text box determined in S506 is not one, S508 is performed to further determine whether there is misjudgment for the plurality of associated text boxes.

S508, determining whether the text box is a preset type, if the text box is the preset type, performing S509, if the text box is not the preset type, performing S510.

Alternatively, in an embodiment of the present disclosure, for the structural relationship between different text boxes, the associated text box should be unique for the text box of the field attribute type, the field value type, or the table cell type; while for the text box of the table header type, there may be a plurality of associated text boxes. Therefore, the preset type in an embodiment of the present disclosure may be the field attribute type, the field value type, or the table cell type. If S507 determines that there are at least two associated text boxes that have the structural relationship with one text box, then it is determined whether the text box belongs to one of the field attribute type, the field value type, or the table cell type. If the text box belongs to one of the field attribute type, the field value type, or the table cell type, it indicates that only one of the plurality of associated text boxes of the text box is correct, in this regard, S509 needs to be performed to determine the final associated text box that has the structural relationship with the text box. If the text box does not belong to one of the field attribute type, the field value type, or the table cell type, it indicates that the text box is the table header type, and it is normal that there is a plurality of associated text boxes. For example, in FIG. 1C, there are two associated text boxes that have a structural relationship with the text box "charged items", namely, the text box "western medicine fee" and the text box "treatment fee". In this regard, the plurality of associated text boxes associated with the text box may be kept, and the operation of extracting structured bill data of the bill image in S510 is directly performed.

S509, determining an associated text box having the highest relationship probability with the text box in at least two associated text boxes as a final associated text box that has the structural relationship with the text box.

Alternatively, if there are a plurality of associated text boxes for one text box, and the text box belongs to the preset type, then in this step, one associated text box needs to be selected from the plurality of associated text boxes as the final associated text box that has the structural relationship with the text box. A specific operation may be: finding a relationship probability between the text box and each associated text box in sequence, from the relationship probability between different text boxes determined in S503, determining the associated text box having the highest relationship probability as the final associated text box that has the structural relationship with the text box. For example, as shown in FIG. 1B, assuming that S506 determines that there are two associated text boxes for the text box "business serial number", namely the text box "254000" and the text box "Jan. 1, 2020". The type of the text box "business serial number" is the field attribute type and belongs to the preset type, therefore, this step may find a first relationship probability between the text box "business serial number" and the text box "254000", and a second relationship probability between the text box "business serial number" and the text box "Jan. 1, 2020". If the first relationship probability is 98% and the second relationship probability is 88%, then the text box "254000" having a higher relationship probability may be selected as the final associated text box that has the structural relationship with the text box "business serial number".

S510, extracting structured bill data of the bill image, based on the type of the text box and the associated text box that has the structural relationship with the text box.

The technical solution of embodiments of the present disclosure, detects the attribute information set and the relationship information set of the text box based on the bill image, extracts the attribute feature set and the relationship feature set of the text box to predict the type probability of the text box and the relationship probability of structural relationship between different text boxes, and infer the type of the text box and the associated text box that has an associated relationship with the text box. If there are a plurality of associated text boxes for one text box, and the text box is the preset type, then based on the relationship probability between the text box and each associated text box, a unique associated text box is determined for the text box, realizing extracting the structured bill data from the bill image. In the solution of embodiments of the present disclosure, after determining the associated text box of each text box, for the text box of the table header type, all the associated text boxes of the text box are kept, and for other types of text boxes, the associated text box having the highest relationship probability is selected. The solution greatly reduces misjudgment for the associated text box, improves the accuracy of associated text box determination, and ensures the accuracy of bill recognition and bill data extraction in embodiments of the present disclosure.

Figure 6:
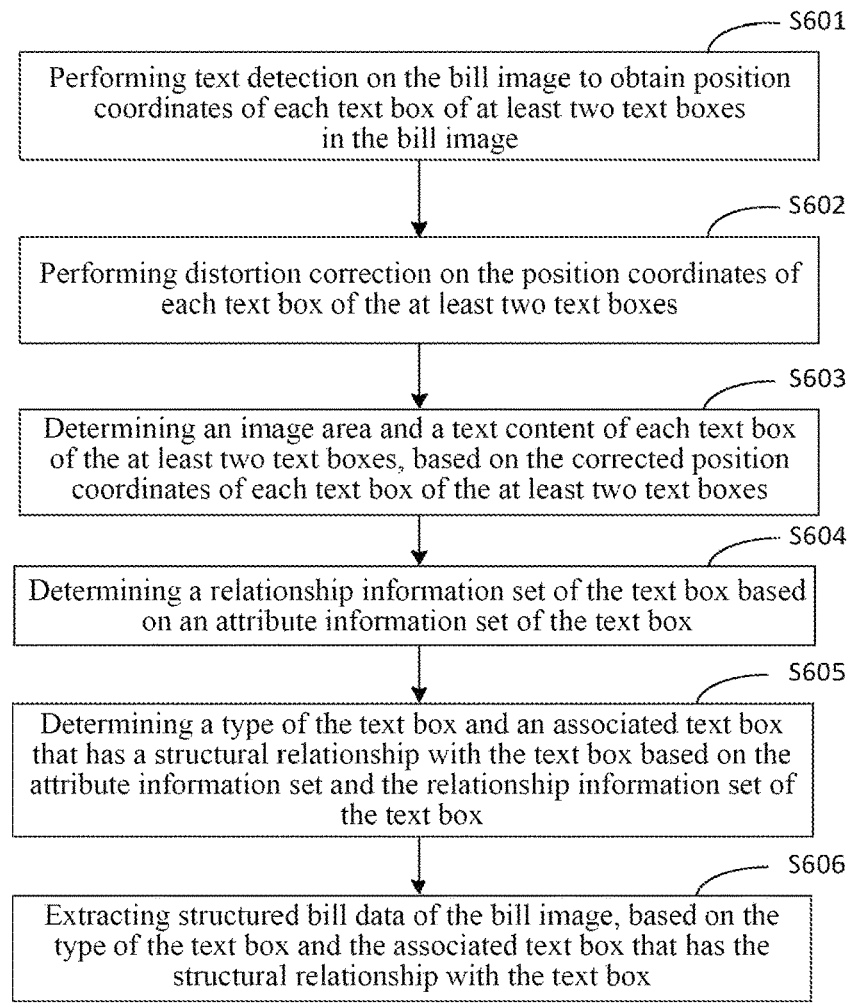
FIG. 6 is a flowchart of another method for recognizing a bill image according to an embodiment of the present disclosure.

FIG. 6 is a flowchart of another method for recognizing a bill image according to an embodiment of the present disclosure. The present embodiment is further optimized on the basis of the above embodiments, and provides a specific situation of performing text detection on a bill image, and determining an attribute information set of at least two of text box in the bill image. As shown in FIG. 6, the method includes following steps.

S601, performing text detection on a bill image to obtain position coordinates of each text box of at least two text boxes in the bill image.

S602, performing distortion correction on the position coordinates of each text box of the at least two text boxes.

Alternatively, for the bill image, the photographed bill image may have certain distortion due to different shooting angles, bill placement methods, and bill flatness. When performing detection on a text content of the bill image based on text detection technology, generally, text strings in the same line are labeled in a text box. Therefore, when the photographed bill image is distorted, it may cause text content detection errors. To solve this problem, in this embodiment of the present disclosure, after performing text detection on the bill image to obtain the position coordinates of each text box of the at least two text boxes in the bill image, distortion correction may be performed on the position coordinates. The specific execution may be to perform distortion correction on the position coordinates of each text box of the at least two text boxes determined in S601 through affine transformation, and the corrected position coordinates are arranged in a regular rectangle. It is also possible to perform correction on the position coordinates using a neural network model, which is not limited in the present embodiment.

S603, determining an image area and a text content of each text box of the at least two text boxes, based on the corrected position coordinates of each text box of the at least two text boxes.

S604, determining a relationship information set of the text box based on an attribute information set of the text box.

S605, determining a type of the text box and an associated text box that has a structural relationship with the text box based on the attribute information set and the relationship information set of the text box.

S606, extracting structured bill data of the bill image, based on the type of the text box and the associated text box that has the structural relationship with the text box.

The technical solution of embodiments of the present disclosure, when determining the attribute information of each text box in the bill image, performs distortion correction on the detected position coordinates of each text box, and then determines the image area and the text content, ensuring the accuracy of the attribute information set of the text box, laying a foundation for determining the relationship information set based on the attribute information set, and accurately inferring the type of each text box and the associated text box of each text box. The solution ensures the accuracy of the structured bill data extracted from the bill image.

Figure 7:
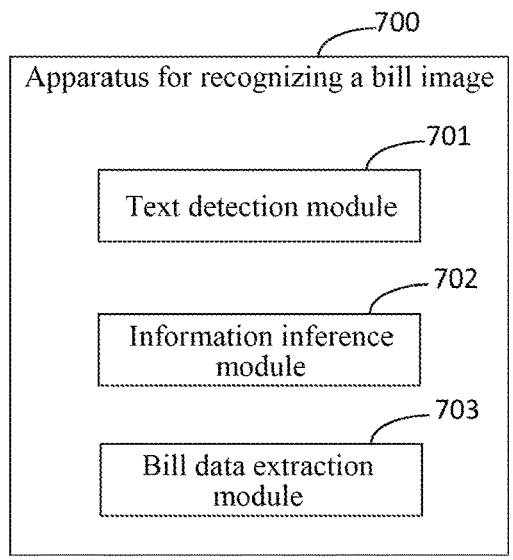
FIG. 7 is a schematic structural diagram of an apparatus for recognizing a bill image according to an embodiment of the present disclosure.

FIG. 7 is a schematic structural diagram of an apparatus for recognizing a bill image according to the present disclosure. The present embodiment is applicable to recognizing a bill image, in particular applicable to recognizing a variety of bill images of unfixed formats. The apparatus may implement the method for recognizing a bill image described in any embodiment of the present disclosure. The apparatus 700 includes following modules.

A text detection module 701 is configured to perform text detection on a bill image, and determine an attribute information set and a relationship information set of each text box of at least two text boxes in the bill image.

An information inference module 702 is configured to determine a type of the text box and an associated text box that has a structural relationship with the text box based on the attribute information set and the relationship information set of the text box.

A bill data extraction module 703, configured to extract structured bill data of the bill image, based on the type of the text box and the associated text box that has the structural relationship with the text box.

The technical solution of embodiments of the present disclosure, detects the attribute information set and the relationship information set of the text box in the bill image to infer the type of the text box and the associated text box that has an associated relationship with the text box, thereby extracting the structured bill data from the bill image. The solution of embodiments the present disclosure may accurately infer structured bill data having a field structural relationship and a table structural relationship in the bill image without template position matching. The solution is not limited by the bill format, can support automatic recognition of a variety of bill images in different formats, and the recognition process does not require use of a template, which improves the versatility and accuracy of bill image recognition.

Further, the type of the text box includes a field attribute type, a field value type, a table header type, or a table cell type; text boxes of the field attribute type and the field value type have a field structural relationship; and text boxes of the table header type and the table cell type have a table structural relationship.

Further, the information inference module 702 includes: a feature determination unit, configured to determine an attribute feature set and a relationship feature set of the text box based on the attribute information set and the relationship information set of the text box; a probability determination unit, configured to determine a type probability of the text box and a relationship probability between different text boxes, based on the attribute feature set and the relationship feature set of the text box; and a type and relationship determination unit, configured to determine the type of the text box and the associated text box that has the structural relationship with the text box, based on the type probability of the text box and the relationship probability between different text boxes.

Further, the feature determination unit is configured to: determine a visual feature of the text box based on an image area in the attribute information set of the text box; determine a semantic feature of the text box based on a text content in the attribute information set of the text box; use the visual feature, the semantic feature, and position coordinates in the attribute information set as the attribute feature set of the text box; and determine the relationship feature set of the text box based on the attribute feature set and the relationship information set.

Further, the probability determination unit is configured to: input the attribute feature set and the relationship feature set of the text box into a probability prediction network to obtain the type probability of the text box and the relationship probability between different text boxes.

The probability prediction network includes at least one sub-prediction network connected end to end; correspondingly, the probability determination unit is configured to: input the relationship feature set of the text box into a first perceptron of a current sub-prediction network to obtain a current perception probability; input the current perception probability and the attribute feature set of the text box into a first hidden layer of the current sub-prediction network to obtain a first hidden text feature; and input the first hidden text feature and the attribute feature set into a long short-term memory network layer of the current sub-prediction network to obtain the type probability of the text box, in response to determining that the current sub-prediction network is a final sub-prediction network, and use the current perception probability as the relationship probability between different text boxes.

Further, after input the current perception probability and the attribute feature set of the text box into a first hidden layer of the current sub-prediction network to obtain a first hidden text feature, the probability determination unit is further configured to: input the first hidden text feature and the attribute feature set into the long short-term memory network layer of the current sub-prediction network to obtain an updated attribute feature set of the text box, in response to determining that the current sub-prediction network is not the final sub-prediction network, and input the updated attribute feature set into a subsequent sub-prediction network; input the first hidden text feature and the relationship feature set into a second hidden layer of the current sub-prediction network to obtain a second hidden text feature; and input the second hidden text feature into a second perceptron of the current sub-prediction network to obtain an updated relationship feature set of the text box, and input the updated relationship feature set into a subsequent sub-prediction network.

Further, the type and relationship determination unit include: a text box type determination subunit, configured to determine the type of the text box based on the type probability of the text box; a text box pair determination subunit, configured to determine a candidate text box pair having the structural relationship, based on the relationship probability between different text boxes and a probability threshold; and an associated text box determination subunit, configured to determine the associated text box that has the structural relationship with the text box, based on the candidate text box pair and the type of the text box.

Further, the type and relationship determination unit further includes: a text box type determination subunit, configured to determine whether the text box is a preset type, in response to determining that there are at least two associated text boxes that have the structural relationship with the text box; and an associated text box selection subunit, configured to, in response to determining that the text box is the preset type, determine an associated text box having a highest relationship probability with the text box in the at least two associated text boxes as a final associated text box that has the structural relationship with the text box.

Further, the attribute information set of the text box includes position coordinates, an image area, and a text content of the text box; and the relationship information set of the text box includes a position coordinate difference, a center point angle difference and a center point Euclidean distance between the text box and another text box.

Further, the text detection module 701 includes: a position determination subunit, configured to perform text detection on the bill image to obtain position coordinates of each text box of the at least two text boxes in the bill image; a position correction subunit, configured to perform distortion correction on the position coordinates of each text box of the at least two text boxes; and an image and text determination subunit, configured to determine an image area and a text content of each text box of the at least two text boxes, based on the corrected position coordinates of each text box of the at least two text boxes.

According to an embodiment of the present disclosure, the present disclosure further provides an electronic device and a readable storage medium.

Figure 8:
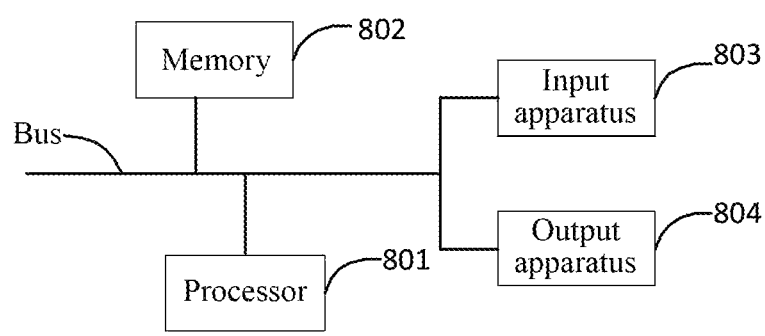
FIG. 8 is a block diagram of an electronic device used to implement the method for recognizing a bill image according to an embodiment of the present disclosure.

As shown in FIG. 8, is a block diagram of an electronic device of the method for recognizing a bill image according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 8, the electronic device includes: one or more processors 801, a memory 802, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations, for example, as a server array, a set of blade servers, or a multi-processor system. In FIG. 8, one processor 801 is used as an example.

The memory 802 is a non-transitory computer readable storage medium provided by embodiments of the present disclosure. The memory stores instructions executable by at least one processor, so that the at least one processor performs the method for recognizing a bill image provided by embodiments of the present disclosure. The non-transitory computer readable storage medium of embodiments of the present disclosure stores computer instructions for causing a computer to perform the method for recognizing a bill image provided by embodiments of the present disclosure.

The memory 802, as a non-transitory computer readable storage medium, may be used to store non-transitory software programs, non-transitory computer executable programs and modules, such as program instructions/modules (for example, the text detection module 701, the information inference module 702 and the bill data extraction module 703 as shown in FIG. 7) corresponding to the method for recognizing a bill image in embodiments of the present disclosure. The processor 801 executes the non-transitory software programs, instructions, and modules stored in the memory 802 to execute various functional applications and data processing of the server, that is, to implement the method for recognizing a bill image in the foregoing method embodiments.

The memory 802 may include a storage program area and a storage data area, where the storage program area may store an operating system and an application program required by at least one function; and the storage data area may store data created by the electronic device for performing the method for recognizing a bill image. In addition, the memory 802 may include a high-speed random access memory, and may also include a non-transitory memory, such as at least one magnetic disk storage device, a flash memory device, or other non-transitory solid-state storage devices. In some embodiments, the memory 802 may optionally include memories remotely provided with respect to the processor 801, and these remote memories may be connected to the electronic device suitable for performing the method for recognizing a bill image through a network. Examples of the above network include but are not limited to the Internet, intranet, local area network, mobile communication network, and combinations thereof.

The electronic device for performing the method for recognizing a bill image may further include: an input apparatus 803 and an output apparatus 804. The processor 801, the memory 802, the input apparatus 803, and the output apparatus 804 may be connected through the bus or in other methods. In FIG. 8, connection through the bus is used as an example.

The input apparatus 803 may receive input digital or character information, and generate key signal inputs related to user settings and function control of the electronic device for performing the method for recognizing a bill image, such as touch screen, keypad, mouse, trackpad, touchpad, pointing stick, one or more mouse buttons, trackball, joystick and other input apparatuses. The output apparatus 804 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a track ball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and Internet.

The computer system may include a client and a server. The client and the server are generally remote from each other and typically interact through the communication network. The relationship between the client and the server is generated through computer programs running on the respective computers and having a client-server relationship to each other.

The technical solution according to an embodiment of the present disclosure, detects the attribute information set and the relationship information set of the text box in the bill image to infer the type of the text box and the associated text box that has an associated relationship with the text box, thereby extracting the structured bill data from the bill image. The solution of embodiments of the present disclosure may accurately infer structured bill data having a field structural relationship and a table structural relationship in a bill image without template position matching. The solution is not limited by the bill format, can support automatic recognition of a variety of bill images in different formats, and the recognition process does not require use of a template, which improves the versatility and accuracy of bill image recognition.

It should be understood that the various forms of processes shown above may be used to resort, add or delete steps. For example, the steps described in embodiments of the present disclosure may be performed in parallel, sequentially, or in a different order. As long as the desired result of the technical solution disclosed in embodiments of the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of embodiments of the present disclosure should be included within the scope of protection of the present disclosure.

What is claimed is:

1. A method for recognizing a bill image, the method comprising:
performing text detection on a bill image, and determining an attribute information set and a relationship information set of each text box of at least two text boxes in the bill image;
for at least some of the text boxes, determining a type of the text box and an associated text box that has a structural relationship with the text box based on the attribute information set and the relationship information set of the text box; and
extracting structured bill data of the bill image, based on the type of the text box and the associated text box that has the structural relationship with the text box,
wherein the determining the type of the text box and the associated text box that has the structural relationship with the text box based on the attribute information set and the relationship information set of the text box, comprises:
determining an attribute feature set and a relationship feature set of the text box based on the attribute information set and the relationship information set of the text box;
determining a type probability of the text box and a relationship probability between different text boxes, based on the attribute feature set and the relationship feature set of the text box; and
determining the type of the text box and the associated text box that has the structural relationship with the text box, based on the type probability of the text box and the relationship probability between different text boxes.

2. The method according to claim 1, wherein,
the type of the text box comprises a field attribute type, a field value type, a table header type, or a table cell type; text boxes of the field attribute type and the field value type have a field structural relationship; and text boxes of the table header type and the table cell type have a table structural relationship.

3. The method according to claim 1, wherein, the determining the attribute feature set and the relationship feature set of the text box based on the attribute information set and the relationship information set of the text box, comprises:
determining a visual feature of the text box based on an image area in the attribute information set of the text box;
determining a semantic feature of the text box based on a text content in the attribute information set of the text box;
using the visual feature, the semantic feature, and position coordinates in the attribute information set as the attribute feature set of the text box; and
determining the relationship feature set of the text box based on the attribute feature set and the relationship information set.

4. The method according to claim 1, wherein, the determining the type probability of the text box and the relationship probability between different text boxes, based on the attribute feature set and the relationship feature set of the text box, comprises:
inputting the attribute feature set and the relationship feature set of the text box into a probability prediction network to obtain the type probability of the text box and the relationship probability between different text boxes.

5. The method according to claim 4, wherein the probability prediction network comprises at least one sub-prediction network connected end to end;
correspondingly, the inputting the attribute feature set and the relationship feature set of the text box into the probability prediction network to obtain the type probability of the text box and the relationship probability between different text boxes, comprises:
inputting the relationship feature set of the text box into a first perceptron of a current sub-prediction network to obtain a current perception probability;

inputting the current perception probability and the attribute feature set of the text box into a first hidden layer of the current sub-prediction network to obtain a first hidden text feature; and inputting the first hidden text feature and the attribute feature set into a long short-term memory network layer of the current sub-prediction network to obtain the type probability of the text box, in response to determining that the current sub-prediction network is a final sub-prediction network, and using the current perception probability as the relationship probability between different text boxes.

6. The method according to claim 5, wherein after the inputting the current perception probability and the attribute feature set of the text box into the first hidden layer of the current sub-prediction network to obtain the first hidden text feature, the method further comprises:

inputting the first hidden text feature and the attribute feature set into the long short-term memory network layer of the current sub-prediction network to obtain an updated attribute feature set of the text box, in response to determining that the current sub-prediction network is not the final sub-prediction network, and inputting the updated attribute feature set into a subsequent sub-prediction network;

inputting the first hidden text feature and the relationship feature set into a second hidden layer of the current sub-prediction network to obtain a second hidden text feature; and inputting the second hidden text feature into a second perceptron of the current sub-prediction network to obtain an updated relationship feature set of the text box, and inputting the updated relationship feature set into a subsequent sub-prediction network.

7. The method according to claim 1, wherein the determining the type of the text box and the associated text box that has the structural relationship with the text box, based on the type probability of the text box and the relationship probability between different text boxes, comprises:

determining the type of the text box based on the type probability of the text box;

determining a candidate text box pair having the structural relationship, based on the relationship probability between different text boxes and a probability threshold; and determining the associated text box that has the structural relationship with the text box, based on the candidate text box pair and the type of the text box.

8. The method according to claim 7, wherein after the determining the associated text box that has the structural relationship with the text box, based on the candidate text box pair and the type of the text box, the method further comprises:

determining whether the text box is a preset type, in response to determining that at least two associated text boxes have the structural relationship with the text box; and in response to determining that the text box is the preset type, determining an associated text box having a highest relationship probability with the text box in the at least two associated text boxes as a final associated text box that has the structural relationship with the text box.

9. The method according to claim 1, wherein, the attribute information set of the text box comprises position coordinates, an image area, and a text content of the text box; and the relationship information set of the text box comprises a position coordinate difference, a center point angle difference and a center point Euclidean distance between the text box and another text box.

10. The method according to claim 1, wherein the performing text detection on the bill image, and determining the attribute information set and the relationship information set of each text box of at least two text boxes in the bill image, comprises:

performing text detection on the bill image to obtain position coordinates of each text box of the at least two text boxes in the bill image;

performing distortion correction on the position coordinates of each text box of the at least two text boxes; and determining an image area and a text content of each text box of the at least two of the text box, based on corrected position coordinates of each text box of the at least two text boxes.

11. An electronic device, comprising:

at least one processor; and a memory, communicatively connected with the at least one processor;

the memory storing instructions executable by the at least one processor, and the instructions, when executed by the at least one processor, causing the at least one processor to perform operations comprising:

performing text detection on a bill image, and determining an attribute information set and a relationship information set of each text box of at least two text boxes in the bill image;

determining a type of the text box and an associated text box that has a structural relationship with the text box based on the attribute information set and the relationship information set of the text box; and extracting structured bill data of the bill image, based on the type of the text box and the associated text box that has the structural relationship with the text box, wherein the determining the type of the text box and the associated text box that has the structural relationship with the text box based on the attribute information set and the relationship information set of the text box, comprises:

determining an attribute feature set and a relationship feature set of the text box based on the attribute information set and the relationship information set of the text box;

determining a type probability of the text box and a relationship probability between different text boxes, based on the attribute feature set and the relationship feature set of the text box; and determining the type of the text box and the associated text box that has the structural relationship with the text box, based on the type probability of the text box and the relationship probability between different text boxes.

12. A non-transitory computer readable storage medium, storing computer instructions, the computer instructions, being used to cause a computer to perform operations comprising:

performing text detection on a bill image, and determining an attribute information set and a relationship information set of each text box of at least two text boxes in the bill image;

determining a type of the text box and an associated text box that has a structural relationship with the text box based on the attribute information set and the relationship information set of the text box; and extracting structured bill data of the bill image, based on the type of the text box and the associated text box that has the structural relationship with the text box, wherein the determining the type of the text box and the associated text box that has the structural relationship with the text box based on the attribute information set and the relationship information set of the text box, comprises:

determining an attribute feature set and a relationship feature set of the text box based on the attribute information set and the relationship information set of the text box;

determining a type probability of the text box and a relationship probability between different text boxes, based on the attribute feature set and the relationship feature set of the text box; and determining the type of the text box and the associated text box that has the structural relationship with the text box, based on the type probability of the text box and the relationship probability between different text boxes.

\* \* \* \* \*